United States Patent
van Lochem et al.

(10) Patent No.: US 9,094,147 B2
(45) Date of Patent: Jul. 28, 2015

(54) SYSTEM CONTROL OF REPEATERED OPTICAL COMMUNICATIONS SYSTEM

(71) Applicant: Xtera Communications, Inc., Allen, TX (US)

(72) Inventors: Gerhard Willem van Lochem, Pretoria (ZA); Stephen Desbruslais, London (GB); David Winterburn, Essex (GB)

(73) Assignee: Xtera Communications, Inc., Allen, TX (US)

( * ) Notice: Subject to any disclaimer, the term of this patent is extended or adjusted under 35 U.S.C. 154(b) by 153 days.

(21) Appl. No.: 13/834,968

(22) Filed: Mar. 15, 2013

(65) Prior Publication Data

US 2014/0270757 A1 Sep. 18, 2014

(51) Int. Cl.
- H04B 10/08 (2006.01)
- H04J 14/02 (2006.01)
- H04B 10/077 (2013.01)
- H04B 10/079 (2013.01)

(52) U.S. Cl.
CPC .......... *H04J 14/02* (2013.01); *H04B 10/0777* (2013.01); *H04B 10/07953* (2013.01); *H04J 14/0227* (2013.01); *H04B 2210/074* (2013.01)

(58) Field of Classification Search
CPC .......... H04B 10/0775; H04B 10/0777; H04B 10/07953; H04B 10/07955

USPC .................................................. 398/25–28
See application file for complete search history.

(56) References Cited

U.S. PATENT DOCUMENTS

| | | | |
|---|---|---|---|
| 2002/0048062 A1* | 4/2002 | Sakamoto et al. | 359/124 |
| 2004/0005151 A1* | 1/2004 | Pitchforth, Jr. | 398/37 |
| 2006/0251423 A1* | 11/2006 | Evangelides et al. | 398/105 |
| 2007/0014571 A1* | 1/2007 | Roberts et al. | 398/25 |
| 2010/0027993 A1* | 2/2010 | Yamaguchi et al. | 398/25 |

* cited by examiner

*Primary Examiner* — Dzung Tran
(74) *Attorney, Agent, or Firm* — Workman Nydegger

(57) ABSTRACT

The system-level control of a repeatered optical communications system. In a repeatered optical communications system, two terminals are optically coupled via an optical communications span having one or more repeaters. One of the terminals may perform the control by monitoring quality metrics of optical signals received over the communication span. Based on this monitoring, certain adjustments are determined to be performed, and the repeater controllers of the respective optical repeaters are instructed to perform the adjustments. In some case, the optical repeater adjustments cannot be made without impacting the performance of the optical signals traveling in the opposite direction. In that case, the system-level control uses monitored quality metrics from both terminals to determine the adjustments to be made. The system level adjustment may be automated by software or the like thereby making optimization of the optical communications span easier.

16 Claims, 4 Drawing Sheets

SYSTEM CONTROL OF REPEATERED OPTICAL COMMUNICATIONS SYSTEM

BACKGROUND

Fiber-optic communication networks serve a key demand of the information age by providing high-speed data between network nodes. Fiber-optic communication networks include an aggregation of interconnected fiber-optic links. Simply stated, a fiber-optic link involves an optical signal source that emits information in the form of light into an optical fiber. Due to principles of internal reflection, the optical signal propagates through the optical fiber until it is eventually received into an optical signal receiver. If the fiber-optic link is bi-directional, information may be optically communicated in reverse typically using a separate optical fiber.

Fiber-optic links are used in a wide variety of applications, each requiring different lengths of fiber-optic links. For instance, relatively short fiber-optic links may be used to communicate information between a computer and its proximate peripherals, or between a local video source (such as a DVD or DVR) and a television. On the opposite extreme, however, fiber-optic links may extend hundreds or even thousands of kilometers when the information is to be communicated between two network nodes.

Long-haul and ultra-long-haul optics refers to the transmission of light signals over long fiber-optic links on the order of hundreds or thousands of kilometers. Typically, long-haul optics involves the transmission of optical signals on separate channels over a single optical fiber, each channel corresponding to a distinct wavelength of light using principles of Wavelength Division Multiplexing (WDM) or Dense WDM (DWDM).

Transmission of optical signals over such long distances using WDM or DWDM presents enormous technical challenges, especially at high bit rates in the gigabits per second per channel range. Significant time and resources may be required for any improvement in the art of high speed long-haul and ultra-long-haul optical communication. Each improvement can represent a significant advance since such improvements often lead to the more widespread availability of communications throughout the globe. Thus, such advances may potentially accelerate humankind's ability to collaborate, learn, do business, and the like, with geographical location becoming less and less relevant.

BRIEF SUMMARY

At least one embodiment described herein relates to the system-level control of a repeatered optical communications system. In a repeatered optical communications system, two terminals are optically coupled via an optical communications span having one or more repeaters. One of the terminals may perform the control by monitoring quality metrics of optical signals received over the communication span. Based on this monitoring, certain adjustments are determined to be performed, and the repeater controllers of the respective optical repeaters are instructed to perform the adjustments.

In some case, the optical repeater adjustments cannot be made without impacting the performance of the optical signals traveling in the opposite direction. In that case, the system-level control uses monitored quality metrics from both terminals to determine the adjustments to be made. The system level adjustment may be automated by software or the like thereby making optimization of the optical communications span easier.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, the system-level control of a repeatered optical communications system is described. One of the terminals may perform the control by monitoring quality metrics of optical signals received over the communication span. Based on this monitoring, certain adjustments are determined to be performed, and the repeater controllers of the respective optical repeaters are instructed to perform the adjustments. In some case, the optical repeater adjustments cannot be made without impacting the performance of the optical signals traveling in the opposite direction. In that case, the system-level control uses monitored quality metrics from both terminals to determine the adjustments to be made. The system level adjustment may be automated by software or the like thereby making optimization of the optical communications span easier.

Figure 1:
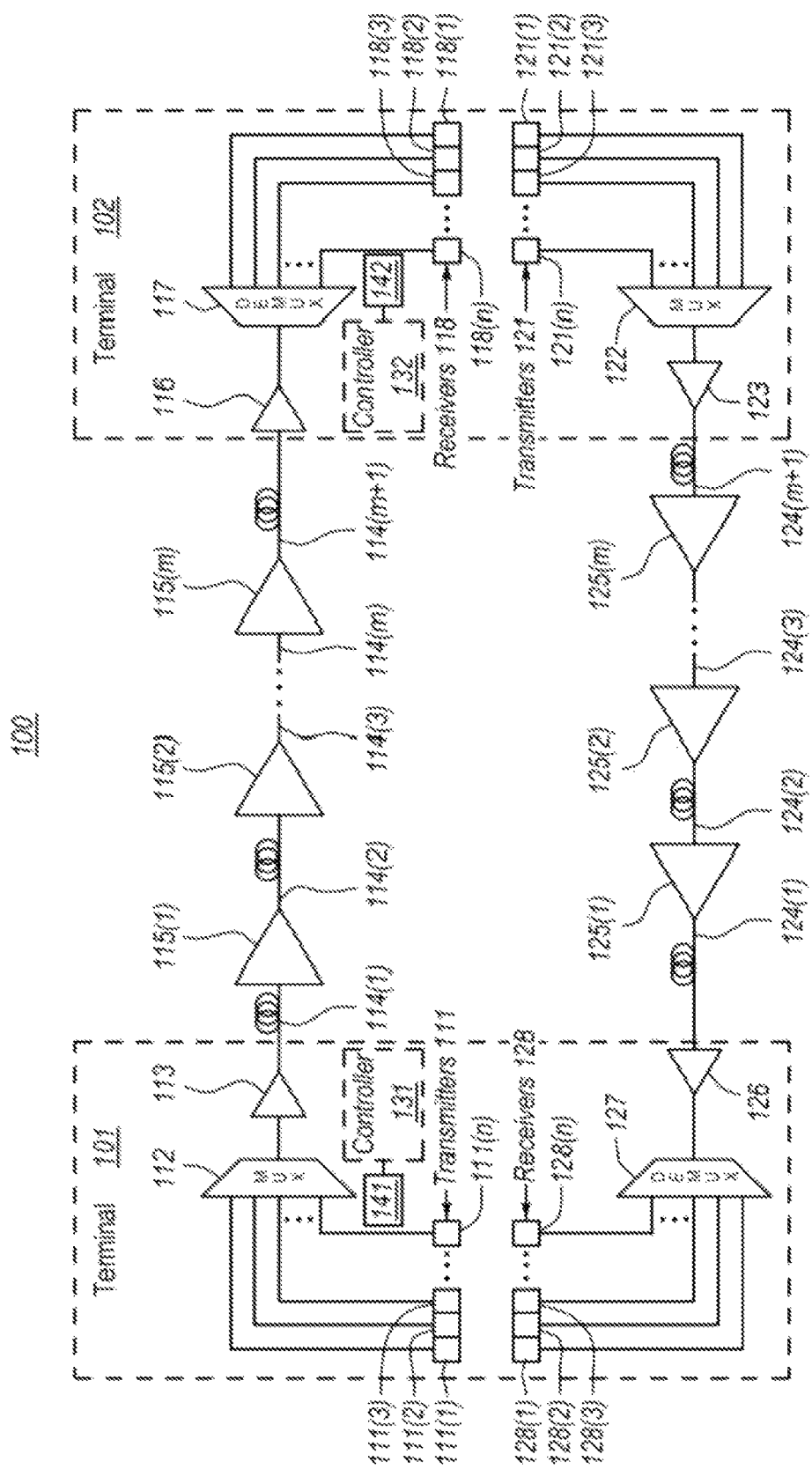
FIG. 1 schematically illustrates an example repeatered optical communications system in which the principles described herein may be employed.

FIG. 1 schematically illustrates an example optical communications system 100 in which the principles described herein may be employed. In the optical communications system 100, information is communicated between terminals 101 and 102 via the use of optical signals. For purposes of convention used within this application, optical signals travelling from the terminal 101 to terminal 102 will be referred to as being "eastern", whereas optical signals traveling from the terminal 102 to the terminal 101 will be referred to as being "western". The terms "eastern" and "western" are simply terms of art used to allow for easy distinction between the two optical signals traveling in opposite directions. The use of the terms "eastern" and "western" does not imply any actual geographical relation of components in FIG. 1, nor to any actual physical direction of optical signals. For instance, terminal 101 may be geographical located eastward of the terminal 102, even though the convention used herein has "eastern" optical signals traveling from the terminal 101 to the terminal 102.

In one embodiment, the optical signals are Wavelength Division Multiplexed (WDM) and potentially Dense Wavelength Division Multiplexed (DWDM). In WDM or DWDM, information is communicated over each of multiple distinct optical channels called hereinafter "wavelength division optical channels". Each wavelength division optical channel is allocated a particular frequency for optical communication. Accordingly, in order to communicate using WDM or DWDM optical signals, the terminal 101 may have "n" optical transmitters 111 (including optical transmitters 111(1) through 111(n), where n is a positive integer), each optical transmitter for transmitting over a corresponding eastern wavelength division optical channel. Likewise, the terminal 102 may have "n" optical transmitters 121 including optical transmitters 121(1) through 121(n), each also for transmitting over a corresponding western wavelength division optical channel. The principles described herein are not limited, however, to communications in which the number of eastern wavelength division optical channels is the same as the number of western wavelength division optical channels. Furthermore, the principles described herein are not limited to the precise structure of each of the optical transmitters. However, lasers are an appropriate optical transmitter for transmitting at a particular frequency. That said, the optical transmitters may each even be multiple laser transmitters, and may be tunable within a frequency range.

As for the eastern channel for optical transmission in the eastern direction, the terminal 101 multiplexes each of the eastern optical signals from the optical transmitters 111 into a single eastern optical signal using optical multiplexer 112, which may then be optically amplified by an optional eastern optical amplifier 113 prior to being transmitted onto a first fiber link 114(1).

There are a total of "m" repeaters 115 and "m+1" optical fiber links 114 between the terminals 101 and 102 in each of the eastern and western channels. However, there is no requirement for the number of repeaters in each of the eastern and western channels to be equal. In an unrepeated optical communications system, "m" would be zero such that there is but a single fiber link 114(1) and no repeaters between the terminals 101 and 102. In a repeatered optical communications system, "m" would be one or greater. Each of the repeaters, if present, may consume electrical power to thereby amplify the optical signals.

The eastern optical signal from the final optical fiber link 114(m+1) is then optionally amplified at the terminal 102 by the optional optical amplifier 116. The eastern optical signal is then demultiplexed into the various wavelength division optical channels using optical demultiplexer 117. The various wavelength division optical channels may then be received and processed by corresponding optical receivers 118 including receivers 118(1) through 118(n).

As for the western channel for optical transmission in the western direction, the terminal 102 multiplexes each of the western optical signals from the optical transmitters 121 (including optical transmitters 121(1) through 121(n)) into a single western optical signal using the optical multiplexer 122. The multiplexed optical signal may then be optically amplified by an optional western optical amplifier 123 prior to being transmitted onto a first fiber link 124(m+1). If the western optical channel is symmetric with the eastern optical channel, there are once again "m" repeaters 125 (labeled 125(1) through 125(m)), and "m+1" optical fiber links 124 (labeled 124(1) through 124(m+1)). Recall that in an unrepeatered environment, "m" may be zero such that there is only one optical fiber link 124(1) and no repeaters 125 in the western channel.

The western optical signal from the final optical fiber link 124(1) is then optionally amplified at the terminal 101 by the optional optical amplifier 126. The western optical signal is then demultiplexed using optical demultiplexer 127, whereupon the individual wavelength division optical channels are received and processed by the receivers 128 (including receivers 128(1) through 128(n)). Terminals 101 and/or 102 do not require all the elements shown in optical communications system 100. For example, optical amplifiers 113, 116, 123, and/or 126 might not be used in some configurations. Furthermore, if present, each of the corresponding optical amplifiers 113, 116, 123 and/or 126 may be a combination of multiple optical amplifiers if desired.

Often, the optical path length between repeaters is approximately the same. The distance between repeaters will depend on the total terminal-to-terminal optical path distance, the data rate, the quality of the optical fiber, the loss-characteristics of the fiber, the number of repeaters (if any), the amount of electrical power deliverable to each repeater (if there are repeaters), and so forth. However, a typical optical path length between repeaters (or from terminal to terminal in an unrepeatered system) for high-quality single mode fiber might be about 50 kilometers, and in practice may range from 30 kilometers or less to 90 kilometers or more. That said, the principles described herein are not limited to any particular optical path distances between repeaters, nor are they limited to repeater systems in which the optical path distances are the same from one repeatered segment to the next.

The optical communications system 100 is represented in simplified form for purpose of illustration and example only. The principles described herein may extend to much more complex optical communications systems. The principles described herein may apply to optical communications in which there are multiple fiber pairs, each for communicating multiplexed WDM optical signals. Furthermore, the principles described herein also apply to optical communications in which there are one or more branching nodes that split one or more fiber pairs and/or wavelength division optical channels in one direction, and one or more fiber pairs and/or wavelength division optical channels in another direction.

The terminal 101 has a respective controller 131 with an associated memory 141 that may store computer-executable instructions that may be executed by the controller 131. Likewise, the terminal 102 has respective controller 132 with an associated memory 142 that may store computer-executable instructions that may be executed by the controller 132. In essence, the terminals 101 and 102 may each thus operate as a computing system.

In this description and in the claims, the term "computing system" is defined broadly as including any device or system (or combination thereof) that includes at least one physical and tangible processor (such as controller 131 or 132), and a physical and tangible memory (such as memory 141 or 142) capable of having thereon computer-executable instructions that may be executed by the processor. The memory may take any form and may depend on the nature and form of the computing system.

Figure 2:
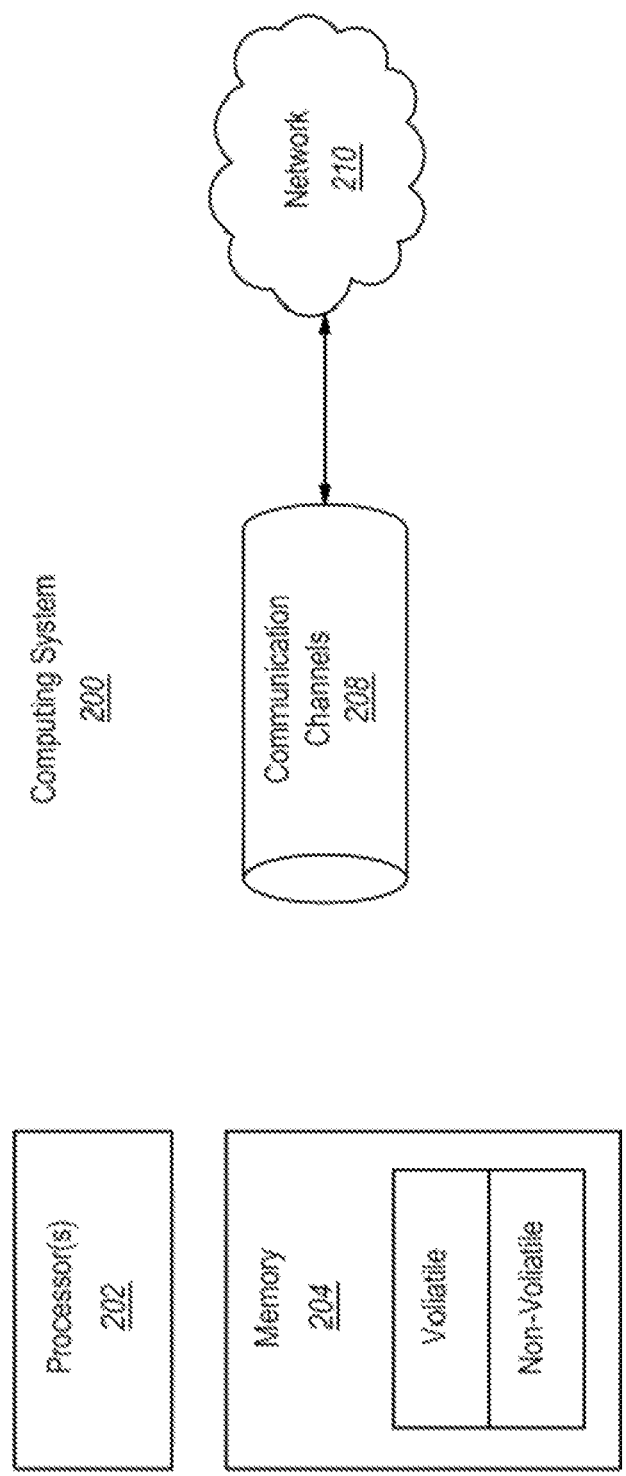
FIG. 2 schematically illustrates a computing system that may be used to operate logic described herein in order to perform system-level control of the repeatered optical communications system of FIG. 1.

As illustrated in FIG. 2, in its most basic configuration, a computing system 200 typically includes at least one processing unit 202 and memory 204. For instance, the processing unit 202 is an example of the controller 131 and the memory 204 is an example of the memory 141 if the terminal 101 were the computing system 200. Likewise, the processing unit 202 is an example of the controller 132 and the memory 204 is an example of the memory 142 if the terminal 102 were the computing system 200.

The memory 204 may be physical system memory, which may be volatile, non-volatile, or some combination of the two. The term "memory" may also be used herein to refer to non-volatile mass storage such as physical storage media. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 204 of the computing system 200. Computing system 200 may also contain communication channels 208 that allow the computing system 200 to communicate with other message processors over, for example, network 210. As an example, the controllers 131 and 132 may communicate with repeater controllers within any of the repeaters 115 or 125. For instance, this communication may be accomplished by modulating a direct current and/or voltage level at a relatively low frequency perhaps in the kilohertz range to transmit control data and status information.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Figure 3:
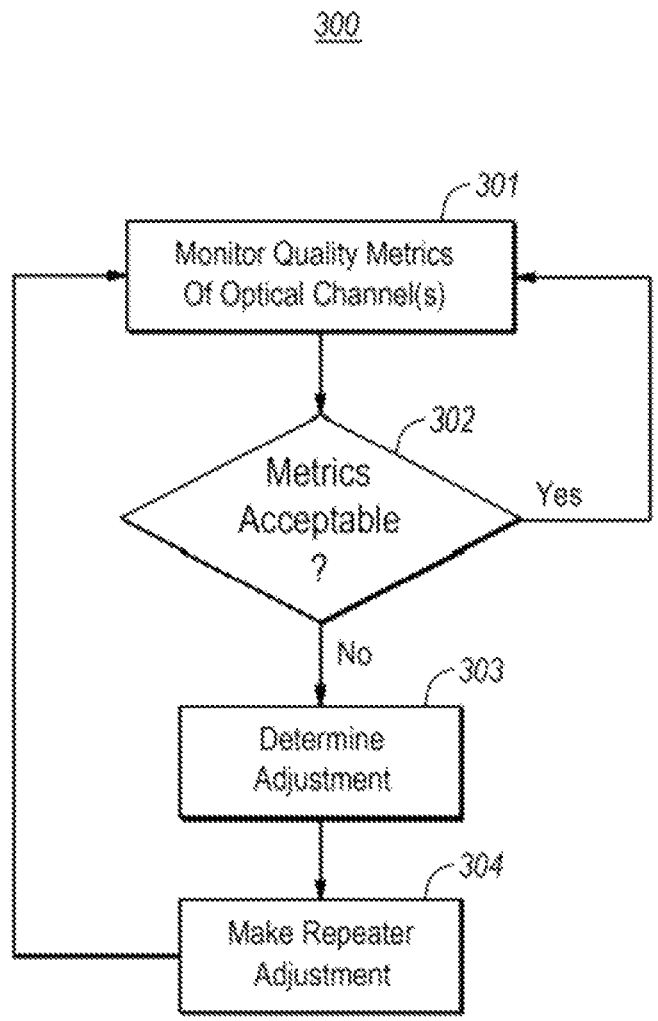
FIG. 3 illustrates a flowchart of a method for controlling a repeatered optical communications system such as that of FIG. 1.

FIG. 3 illustrates a flowchart of a method 300 for controlling a repeatered optical communications system. For instance, the method 300 may be performed by the controller 131 and/or the controller 132 to control the optical communications system 100 of FIG. 1. Accordingly, the method 300 of FIG. 3 will now be described with frequent reference to the optical communications system 100 of FIG. 1. The controllers 131 and/or 132 may each perform the method 300 by executing computer-executable instructions that are stored on one or more computer-readable storage media that are included within a computer program product.

The method 300 includes monitoring quality metrics of at least some, most, or even all of multiple optical signals received from the opposite terminal over the communication span (act 301). For instance, if the method 300 were performed by the terminal 101 of FIG. 1, the terminal 101 might monitor the signal metrics of each of the western signals received over each of the DWDM channels on the western optical communications span (comprising fiber links 124 and optical repeaters 125) from the terminal 102. If the method 300 were performed by the terminal 102 of FIG. 1, the terminal 102 might monitor the signal metrics of each of the eastern signals received over each of the DWDM channels on the eastern optical communications span (comprising fiber links 114 and optical repeaters 115) from the terminal 101. Example quality metrics include Bit-Error Rate (BER), Q-factor, and Optical Signal to Noise Ratio (OSNR) of each of at least some, most, or all of the received optical signals.

The terminal then determines whether the monitored quality metrics are within acceptable levels (decision block 302). For instance, if the quality metrics are bit-error rates, or optical signal to noise ratios, the terminal might determine whether or not these rates and/or ratios are below an acceptable threshold in the aggregate across all monitored DWDM channels. If the quality metrics are Q-factors, the terminal might determine whether or not the factors are above an acceptable threshold in the aggregate across all monitored DWDM channels.

If the monitored metrics are within acceptable limits ("Yes" in decision block 302), then the method 300 may end if the method 300 is to be performed but once. If the method 300 is to be continued, then the method 300 may return to monitoring of the quality metrics (act 301). In some embodiments, the quality metrics may be monitored periodically, and/or perhaps in response to certain events. In other embodiments, the quality metrics may be continuously monitored.

If the monitored metrics are not within acceptable limits ("No" in decision block 302), the method uses statistics of the monitored metrics to determine an adjustment to be made in the performance of each of at least one optical repeater in the optical communication span (act 303). For instance, if the method 300 is performed by the terminal 101, the terminal 101 determines an adjustment to make in one or more of the western repeaters 125 in the western optical communications span. If the method 300 is performed by the terminal 102, the terminal 102 determines an adjustment to make in one or more of the eastern repeaters 115 in the eastern optical communications span.

In this description and in the claims, the "adjustment of" a repeater in response to monitoring the quality metrics of an optical communications span refers to the adjustment of one or more amplifiers in that repeater that serve the optical communications span. For instance, in FIG. 1, only one optical communication span in each direction is illustrated for clarity. However, a repeater may have numerous (e.g., four) optical communication spans in each direction. Thus, the "adjustment of a repeater" in response to detecting quality metrics of optical signals in a first communication span will result in some adjustment to one or more repeaters with respect to that first communication span.

Figure 4:
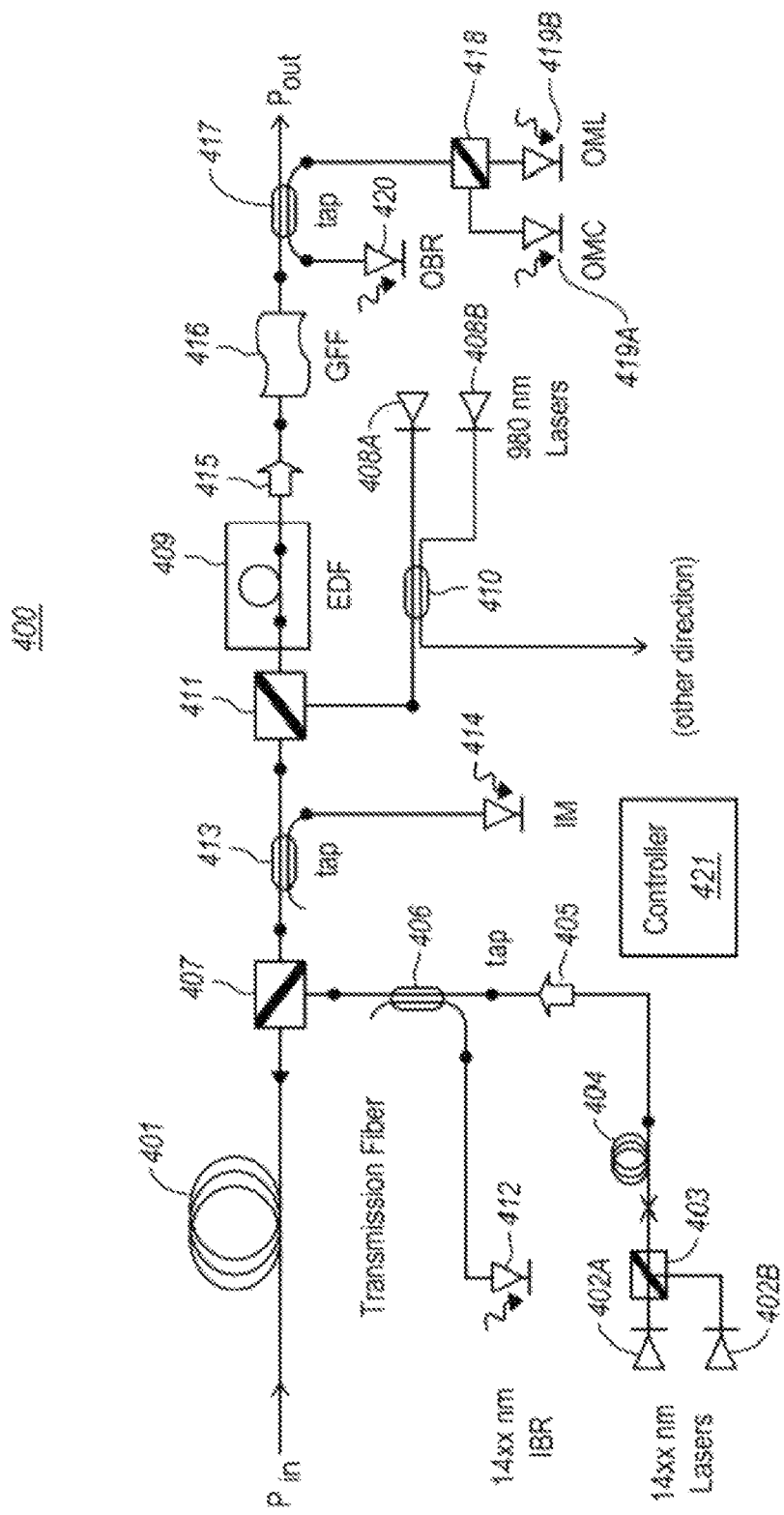
FIG. 4 illustrates an example optical repeater in which optical circuitry associated with the amplification of optical signals within an eastern optical communications span is illustrated.

FIG. 4 illustrates an example optical repeater 400 in which optical circuitry associated with the amplification of optical signals within an eastern optical communications span is illustrated. However, a mirror image of the illustrated circuitry (not shown) may be used to amplify western optical signals in the western communications span. For instance, the optical repeater 400 might be an example of the combination of the repeaters 115(1) and 125(1). Likewise, the optical repeater 400 might be an example of the combination of repeaters 115(2) and 125(2), and continued, all the way to the combination of repeaters 115(m) and 125(m). Thus, there may be "m" bi-directional optical repeaters supplying all of the repeaters for both the eastern and western optical communications spans in FIG. 1.

As will be described in further detail below with respect to FIG. 4, each direction (eastern and western) of a fiber pair has its own redundant optical Raman pumps, and thus the Raman amplification can be independently controlled in the eastern and western directions. However, a redundant optical rare-Earth doped fiber amplifier pump is provided to both the eastern and western optical communication spans. Accordingly, the quality of the eastern optical channels and the western optical channels cannot be independently controlled for those optical channels that share the rare-Earth doped fiber pump. In these cases, both terminals (e.g., terminals 101 and terminal 102) monitor the quality metrics of the optical signals.

In this case, if the method 300 were performed by the terminal 101, the terminal 102 would communicate to the terminal 101 regarding the monitored quality metrics of the eastern communications span. In that case the terminal 101 could use both 1) the quality metrics directly of the western communications span that is directly measured by the terminal 101 and 2) the communication regarding the quality metrics measured by the terminal 102, to determine the adjustment to be made to each of one or more of the repeaters.

If the method 300 were performed by the terminal 102, the terminal 101 would communicate to the terminal 102 regarding the monitored quality metrics of the western communications span. In that case the terminal 102 could use both 1) the quality metrics directly of the eastern communications span that is directly measured by the terminal 102 and 2) the communication regarding the quality metrics measured by the terminal 101, to determine the adjustment to be made to each of one or more of the repeaters. Thus, the adjustment could be collaboratively determined in a distributed way by the terminals 101 and 102.

The method 300 then includes causing instructions to be dispatched to a repeater controller (act 304) of each of the one or more repeaters to perform the respective determined adjustments for that repeater. For instance, if the terminal 101 were to perform the method 300, the terminal 101 might transmit the instructions to any of the repeaters 125(1) through 125(m), which would include respective repeaters 115(1) through 115(m) if bi-directional optical repeaters. Likewise, if the terminal 102 were to perform the method 300, the terminal 102 might transmit the instructions to any of the repeaters 115(1) through 115(m), which would include respective repeaters 125(1) through 125(m) if bi-directional optical repeaters. In one embodiment, communication of control and status data may occur between the terminals 101 and 102 and the optical repeaters 115 and 125 by modulating lower frequency signals on the direct current electrical power supply line.

As an example, the repeater controller may be responsive to higher level directives from the terminals to adjust itself to have a certain output optical power in a particular direction. The repeater control might then respond to that directive by adjusting its internal operational parameters (such as Raman pump power or rare-Earth doped fiber amplifier pump power) until the directed output power is achieved in the relevant direction, or at least until the repeater has obtained as close as possible to the directed output power in the relevant direction. The repeater controller might also be given directives with respect to output optical power in the opposite direction, and might similarly respond.

As another example, the repeater controller may be responsive to higher level directives to adjust itself to having an output optical power that is within a certain range of output powers. The repeater controller might then respond to that directive by adjusting its internal operational parameters until the directed output power is detected to be within the power range in the relevant direction. The repeater controller might also be given directives with respect to output optical power in the opposite direction, and might similarly respond.

On the other hand, the optical repeater might allow the terminal to have more fine-grained control of the optical repeater by responding to instructions to adjust the internal parameters of the repeater. For instance, the terminal itself might instruct a particular optical repeater to adjust the Raman pump power (or the rare-Earth doped fiber amplifier pump power) in one direction to a particular level or range, to adjust the Raman pump power (or the rare-Earth doped fiber amplifier pump power) in the opposite direction to a particular level or range.

The optical repeater might have certain modes of operation. For instance, in a first mode of operation, more control is given to the repeater controller by having the repeater controller respond to high level directives to adjust the output power in one or both directions, but leaving it to the repeater controller to adjust its own internal parameters in a manner to achieve the directive. In this case, the repeater controller might simply not receive (or might ignore any received) lower level commands to adjust the internal repeater parameters in particular ways. In a second mode of operation, more refined control is given to the terminal such that the optical repeater will respond to lower level commands to adjust the internal repeater parameters in particular ways.

Once the adjustment is instructed (act 304), the method 300 returns to monitor the quality metrics (act 301) in order to determine what impact the adjustment had on the quality metrics. This control loop may be repeated again and again until an acceptable quality metric has been detected ("Yes" in decision block 302). For instance, terminal 101 might adjust each repeater one at a time, and in-between each adjustment, determine if performance was improved. If the performance was not improved, the adjustment might be undone, and another adjustment made to the same repeater, or to another repeater may be determined to be performed. In the end, this revolving processing may cause the performance of at least one parameter from most or perhaps all of the repeaters to be adjusted.

FIG. 4 illustrates eastern channel optics 400 of an optical repeater. Similar optics might be present in the western optical channel of the fiber pair to complete the amplification circuitry for a single fiber pair in the optical repeater. Multiple instances of the optical fiber pair amplification optics may be included in the repeater to accommodate amplification of multiple fiber pairs that pass through the optical repeater.

The transmission fiber 401 is actually not part of the repeater itself, but merely represents the prior fiber link that leads from the prior repeater to the current repeater. For instance, if the remaining optics were part of repeater 115(2) of FIG. 1, then the transmission fiber 401 might represent optical fiber link 114(2) of FIG. 1. The optical signal travels eastward from left to right in FIG. 4.

Redundant optical pumps 402A and 402B (collectively referred to as "Raman optical pumps 402") operate in the 1400 nanometer wavelength range, and provide the optical pump power to perform distributed backward Raman amplification in the transmission fiber 401. In particular, the Raman pump power from Raman optical pump 402A is combined with the Raman pump power from Raman optical pump 402B within wavelength division multiplexer 403, which passes through a polarization maintaining fiber splice 404, through isolator 405, and through coupler 406, after which the optical pump power is multiplexed at wavelength division multiplexer 407 to counter-propagate against the optical signal. This counter-propagation thereby causes distributed backwards Raman amplification within the transmission fiber 401. The total power of the backward Raman amplification in each direction in the eastern direction (shown in FIG. 4), and the western direction (not shown in FIG. 4) are two examples of internal parameters that might be adjusted by the repeater controller (if the repeater in a mode to allow the repeater controller to alter these parameters) or by the terminal (if the repeater is in a mode to allow the terminal to alter these parameters.

The optical pumps 408A and 408B (collectively, "pumps 408") are optical pumps used to power a rare-Earth doped fiber amplifier 409, which is an Erbium-doped fiber amplifier in FIG. 4. The optical power from the optical pumps 408A and 408B are combined in coupler 410, after which a portion of the combined optical pump power is introduced into the eastern signal path using wavelength division multiplexer 411. This optical pump power is shared between the eastern and western channels as the coupler 410 causes half of the optical pump power to be supplied to the eastern channels as shown, and another half of the optical pump power to be supplied to the western channels (not shown). Thus, it is impossible to adjust the power of the optical pumps 408 without affecting the amplification in both the eastern and western directions. Hence, the terminals 101 and 102 might coordinate in the case of any potential adjustment to be made to the optical pump power of pumps 408.

The optical signal path will now be described. The eastern optical signal travels eastward through the transmission fiber 401, and generally experiences logarithmic decay due to transmission fiber losses. However, the closer that the optical signal gets to the multiplexer 407 the stronger the power encountered from the counter-propagating backwards Raman pump power. Thus, the optical signal experiences more and more distributed gain as the optical signal approaches the repeater.

The optical signal passes through the multiplexer 407. However, Raleigh backscattered light is diverted by multiplexer 407, and a portion of that scattered light is extracted by coupler 406 for sampling at PIN diode 412. The monitoring of backscattered Raleigh scattering is not critical to the principles described herein, but has been described for the sake of completeness.

A small portion of the optical signal that passes through the multiplexer 407 is extracted from the signal path using coupler 413 and sampled using input power monitor PIN diode 414. The repeater controller 421 may use this input power to evaluate what internal parameter adjustment should be done in response to a high level directive to adjust repeater output optical power.

The majority of the optical signal passes through the coupler 413 and further through the multiplexer 411 after which the optical signal is discretely amplified at the rare-Earth doped fiber amplifier 409. The amplified optical signal then passes through isolator 415, whereupon its gain is flatten across the DWDM frequency spectrum using gain flattening filter 416.

A coupler 417 extracts a small portion of this output signal, which is then split into the C-band and L-band using multiplexer 418. The C-band portion of the sampled output optical signal is sampled by the output monitor PIN diode 419A. The L-band portion of the sampled output optical signal is sampled by the output PIN diode 419B. The repeater controller 421 may use this output power to evaluate what internal parameter adjustment should be done in response to a high level directive to adjust repeater output optical power. In the case of adjusting the output power to a range, it is possible that the C-band optical output power may be significantly different than the L-band optical output power, so long as both powers are within the range. In that case, the output optical signal might have some tilt associated with it, although in many cases, the gain flattening filter 416 may have significantly removed much of the tilt.

Although not related to the inventive principles described herein, an output back reflection monitor 420 samples backscattered optics received back into the output terminal of the repeater.

Of course, FIG. 4 is just an example of one amplifier that could be used to implement the inventive principles herein. For example, the principles described herein may be used to adjust repeaters that do not use Raman amplification, or that include alternative types of doped fiber for amplification (i.e., not necessarily erbium). Furthermore, the principles described herein may be used in designs in which the amplification in the two directions are not interrelated through a common pumping arrangement. For the purposes of the control algorithms described herein, benefit may be achieved for any repeater having in each direction an amplifier, at least one pump, one or more amplification media, and monitor diodes. The monitor diodes provide measurements to the terminals and the terminals in turn adjust the pumps to optimize performance.

There are a wide variety of algorithms that could be used to determine the adjustment to be made to each of the repeaters (act 303 of FIG. 3). As one example, perhaps the terminal dithers the output power of each the optical repeaters one or two steps in one direction, and one or two steps in another direction, to determine whether these various repeater output powers made a difference in the monitored quality metrics. This could be done beginning at the first repeater and continuing for all other repeaters. Whenever improved quality metrics are detected above a certain difference, perhaps the change in repeater output power is permitted to remain. According to this algorithm, once the last repeater is dithered, the algorithm begins again at the first repeater, and so on and so forth, until the desired quality metrics are achieved.

As part of the optimization process, an adjustment in pre-emphasis (i.e., the power per channel launched by the terminal equipment) may be performed. This can be helpful in instances in which the OSNR has a tilt with respect to wavelength. Preemphasis could thus be optimized by applying a countering tilt to the launch powers with respect to wavelength. Thus, dithering or other continuous control algorithm may apply to the amplifier adjustment in any of the repeaters in the optical communications span, as well as the preemphasis at the terminal.

Accordingly, a mechanism for automated control of a repeatered optical communications network is described. The principles described herein apply regardless of whether the network is a submarine or terrestrial optical communications network.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-readable storage media having thereon computer-executable instructions that are structured such that, when executed by one or more processors of a computing system, cause the computing system to perform a method for controlling a repeatered optical communications system having an optical communication span optically coupling a first terminal and a second terminal via a plurality of optical repeaters, the method comprising:
 an act of monitoring quality metrics of at least some of the plurality of optical signals received from the optical communications span from the second terminal;
 an act of determining an adjustment to be made in the performance of a first of the plurality of optical repeaters using at least the monitored quality metrics obtained during a first period;
 in response to the act of determining the adjustment to be made in the performance of the first of the plurality of optical repeaters using at least the monitored quality metrics obtained during the first period, an act of causing an instruction to perform the determined adjustment to be dispatched to a repeater controller of the first of the plurality of optical repeaters;
 an act of determining an adjustment to be made in the performance of a second of the plurality of optical repeaters using at least the monitored quality metrics a second period; and
 in response to the act of determining the adjustment to be made in the performance of the second of the plurality of optical repeaters, an act of causing an instruction to perform the determined adjustment to be dispatched to a repeater controller of the second of the plurality of optical repeaters.

2. The computer program product in accordance with claim 1, wherein the acts of determining the adjustments to be made in the performance of each of the first and second of the plurality of optical repeaters using at least the monitored quality metrics are performed also using a communication from the second terminal regarding quality metrics of at least some of a plurality of optical communication signals received by the second terminal over the optical communications span.

3. The computer program product in accordance with claim 1, wherein the quality metric for at least one of the optical signals comprises at least one of a bit-error rate, a Q-factor, and an optical signal to noise ratio.

4. The computer program product in accordance with claim 1, wherein at least one of the instructions for adjustment comprises an instruction for the respective repeater control to adjust an output optical power of the corresponding optical repeater to a particular level.

5. The computer program product in accordance with claim 1, wherein at least one of the instructions for adjustment comprises an instruction for the respective repeater controller to adjust the output optical power of the corresponding optical repeater to within a particular range.

6. The computer program product in accordance with claim 1, wherein at least one of the instructions for adjustment comprises an instruction for the respective repeater controller to adjust a Raman pump power of the corresponding optical repeater.

7. The computer program product in accordance with claim 1, wherein at least one of the instructions for adjustment comprises an instruction for the respective repeater controller to adjust a rare-Earth doped fiber amplifier pump power of the optical repeater.

8. A method for a first terminal controlling a repeatered optical communications system having an optical communication span optically coupling a first terminal and a second terminal via a plurality of optical repeaters, the method comprising:
 an act of monitoring quality metrics of at least some of a plurality of optical signals received from the optical communications span from the second terminal;
 an act of determining an adjustment to be made in the performance of a first of the plurality of optical repeaters using at least the monitored quality metrics obtained during a first period;
 in response to the act of determining the adjustment to be made in the performance of the first of the plurality of optical repeaters using at least the monitored quality metrics obtained during the first period, an act of causing an instruction to perform the determined adjustment to be dispatched to a repeater controller of the first of the plurality of optical repeaters;
 an act of determining an adjustment to be made in the performance of a second of the plurality of optical repeaters using at least the monitored quality metrics a second period; and in response to the act of determining the adjustment to be made in the performance of the second of the plurality of optical repeaters, an act of causing an instruction to perform the determined adjustment to be dispatched to a repeater controller of the second of the plurality of optical repeaters.

9. The method in accordance with claim 8, wherein the acts of determining the adjustments to be made in the performance of each of the first and second of the plurality of optical repeaters using at least the monitored quality metrics are performed also using a communication from the second terminal regarding quality metrics of at least some of a plurality of optical communication signals received by the second terminal over the optical communications span.

10. The method in accordance with claim 8, wherein the plurality of optical signals are each received over a corresponding one of a plurality of Dense Wavelength Division Multiplexing (DWDM) channels.

11. The method in accordance with claim 10, wherein the act of monitoring quality metrics of at least some of a plurality of optical signals received from the optical communications span from the second terminal comprises an act of monitoring quality metrics of all of the DWDM channels.

12. An optical communications system comprising:
a first terminal; and
an optical communications span optically coupling the first terminal with a second terminal via optical repeaters, at least a plurality of the optical repeaters having a repeater controller;
wherein the first terminal includes a system controller that is configured to performing the following:
an act of monitoring quality metrics of at least some of a plurality of optical signals received from the optical communications span from the second terminal;
an act of determining an adjustment to be made in the performance of a first of the plurality of optical repeaters using at least the monitored quality metrics obtained during a first period;
in response to the act of determining the adjustment to be made in the performance of the first of the plurality of optical repeaters using at least the monitored quality metrics obtained during the first period, an act of instructing the repeater controller of a first of the plurality of optical repeaters to perform the determined adjustments; and
an act of determining an adjustment to be made in the performance of a second of the plurality of optical repeaters using at least the monitored quality metrics a second period;
in response to the act of determining the adjustment to be made in the performance of the second of the plurality of optical repeaters using at least the monitored quality metrics obtained during the second period, an act of instructing the repeater controller of a second of the plurality of optical repeaters to perform the determined adjustment.

13. The optical communications system in accordance with claim 12, further comprising the second terminal, wherein the second terminal is configured to perform the following:
an act of monitoring quality metrics of at least some of a plurality of optical signals received from the optical communications span from the first terminal;
an act of communicating with the first terminal based on the act of monitoring quality metrics of at least some of the plurality of optical signals received from the optical communications span from the first terminal 14. The optical communications system in accordance with claim 12, wherein the first terminal is configured to perform the acts of determining the adjustments to be made in the performance of each of the first and second plurality of optical repeaters using also the communication from the first terminal.

15. The optical communications system in accordance with claim 12, wherein the system controller performs the acts of determining by executing software instructions.

16. The optical communications system in accordance with claim 12, wherein at least one of the plurality of optical repeaters comprises a mode selection function allowing the first terminal different levels of control over the corresponding optical repeater.

* * * * *